US012673733B2

(12) United States Patent
Choi et al.

(10) Patent No.: US 12,673,733 B2
(45) Date of Patent: Jul. 7, 2026

(54) JOINT STRUCTURE OF VEHICLE BODY

(71) Applicants:Hyundai Motor Company, Seoul
(KR); Kia Corporation, Seoul (KR)

(72) Inventors: Sun Ki Choi, Hwaseong-si (KR);
Youngho Lee, Gunpo-si (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 389 days.

(21) Appl. No.: 18/460,071

(22) Filed: Sep. 1, 2023

(65) Prior Publication Data

US 2024/0300589 A1 Sep. 12, 2024

(30) Foreign Application Priority Data

Mar. 6, 2023 (KR) ........................ 10-2023-0029098

(51) Int. Cl.
| | |
|---|---|
| *B62D 27/06* | (2006.01) |
| *B62D 25/02* | (2006.01) |
| *B62D 25/20* | (2006.01) |
| *B62D 27/00* | (2006.01) |
| *B62D 27/02* | (2006.01) |
| *B62D 63/02* | (2006.01) |

(52) U.S. Cl.
CPC ......... *B62D 27/065* (2013.01); *B62D 25/025*
(2013.01); *B62D 25/2036* (2013.01); *B62D
27/023* (2013.01); *B62D 63/025* (2013.01)

(58) Field of Classification Search
CPC .. B62D 25/06; B62D 25/025; B62D 25/2036;
B62D 25/2009; B62D 27/065; B62D
27/023; B62D 63/025

USPC .. 296/193.03–9, 29, 30, 210, 23.01, 203.03,
296/209
See application file for complete search history.

(56) References Cited

U.S. PATENT DOCUMENTS

| | | | | | |
|---|---|---|---|---|---|
| 978,336 | A | * | 12/1910 | Proctor ................... | B62B 3/007 |
| | | | | | 296/35.3 |
| 1,621,675 | A | * | 3/1927 | Masury .................. | B62D 31/02 |
| | | | | | 296/193.03 |
| 2,843,417 | A | * | 7/1958 | Wahl ........................ | B60D 5/00 |
| | | | | | 280/492 |
| 3,393,920 | A | * | 7/1968 | Ehrlich ................ | B62D 33/048 |
| | | | | | 280/789 |
| 4,842,326 | A | * | 6/1989 | DiVito ...................... | B60P 3/42 |
| | | | | | 296/10 |
| 4,887,859 | A | * | 12/1989 | Aper .................... | B62D 47/006 |
| | | | | | 296/193.03 |
| 4,968,087 | A | * | 11/1990 | Goria ..................... | B62D 65/04 |
| | | | | | 296/29 |
| 5,112,099 | A | * | 5/1992 | Yurgevich .............. | B62D 33/04 |
| | | | | | 52/464 |

(Continued)

FOREIGN PATENT DOCUMENTS

| | | | | | | |
|---|---|---|---|---|---|---|
| CN | | 120117056 | A | * | 6/2025 | ............. B62D 25/20 |
| DE | | 4410172 | C2 | * | 8/1996 | ........... B62D 27/026 |
| DE | 102013203512 | A1 | * | 9/2013 | ........... B62D 63/025 |

*Primary Examiner* — Patricia L Engle
(74) *Attorney, Agent, or Firm* — Slater Matsil, LLP

(57) ABSTRACT

An embodiment joint structure of a vehicle body includes a
front body module connected to a front part of an under body
of the vehicle body, a rear body module connected to a rear
part of the under body of the vehicle body, and a joint unit
connecting an outside and an inside of the front body module
and the rear body module in a front-to-back direction of the
vehicle body.

20 Claims, 12 Drawing Sheets

(56)                 References Cited

U.S. PATENT DOCUMENTS

| | | | | |
|---|---|---|---|---|
| 5,664,826 | A * | 9/1997 | Wilkens | B62D 33/04 |
| | | | | 52/270 |
| 5,860,693 | A * | 1/1999 | Ehrlich | B62D 29/045 |
| | | | | 52/584.1 |
| 6,003,932 | A * | 12/1999 | Banerjea | B62D 33/04 |
| | | | | 52/464 |
| 6,010,020 | A * | 1/2000 | Abal | B62D 33/04 |
| | | | | 296/186.1 |
| 6,652,018 | B2 * | 11/2003 | Buchholz | B62D 33/046 |
| | | | | 52/800.11 |
| 6,890,014 | B1 * | 5/2005 | King | B60P 3/423 |
| | | | | 296/99.1 |
| 6,896,319 | B1 * | 5/2005 | Huang | B62D 25/02 |
| | | | | 296/193.06 |
| 6,979,051 | B2 * | 12/2005 | Jones | B62D 33/04 |
| | | | | 296/182.1 |
| 7,100,971 | B2 * | 9/2006 | Pines | B62D 33/04 |
| | | | | 296/29 |
| 7,527,325 | B2 * | 5/2009 | Yurgevich | B62D 33/046 |
| | | | | 296/186.1 |
| 8,506,221 | B2 * | 8/2013 | Pattison | B65D 90/0053 |
| | | | | 296/191 |
| 8,727,426 | B2 * | 5/2014 | Vitale | B62D 21/14 |
| | | | | 296/193.04 |
| 9,469,311 | B2 * | 10/2016 | Kuroda | B61D 17/08 |
| 12,098,024 | B2 * | 9/2024 | Sedory | B65D 90/023 |
| 2024/0190519 | A1 * | 6/2024 | Jung | B62D 27/06 |
| 2025/0187676 | A1 * | 6/2025 | Choi | B62D 23/005 |
| 2025/0196936 | A1 * | 6/2025 | Park | B62D 27/065 |

* cited by examiner

Rearward

Forward

JOINT STRUCTURE OF VEHICLE BODY

CROSS-REFERENCE TO RELATED APPLICATIONS

This application claims the benefit of Korean Patent Application No. 10-2023-0029098, filed on Mar. 6, 2023, which application is hereby incorporated herein by reference.

TECHNICAL FIELD

The present invention relates to a vehicle body.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

A PBV can be an example of an electric vehicle (EV)-based environment-friendly mobile vehicle. This PBV can provide various customized services to users while moving from a starting point to a destination in an unmanned autonomous driving method.

The vehicle body of such a PBV is composed of an under body (also referred to as a rolling chassis or a skateboard in the art) and an upper body assembled to the under body.

Here, the upper body may be configured in various forms according to the type of customized service of the PBV. For example, the PBV can be used as a hailing type vehicle having cabins respectively configured in the front and rear parts of the upper body. Furthermore, the PBV may be used as a cab type vehicle in which a cabin is configured only in the front portion of the upper body. Furthermore, the PBV may be used as a delivery type vehicle in which a cabin is configured in the front part of the upper body and a luggage room is configured in the rear part.

Therefore, according to conventional art, the cost of changing the structure of the upper body may increase according to various customized services of the PBV as described above.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body. Particular embodiments relate to a joint structure of a vehicle body of a purpose built vehicle (PBV).

Embodiments of the present disclosure provide a joint structure of a vehicle body that can be replaced with various types of vehicle bodies according to the type of customized service of the PBV.

A joint structure of a vehicle body according to an exemplary embodiment of the present invention may include a front body module connected to a front part of an under body, a rear body module connected to a rear part of the under body, and a joint unit connecting the outside and inside of the front body module and the rear body module in the front-to-back direction of the vehicle body.

The front body module may be a fixed part fixed to the front part of the under body.

The rear body module may have a predetermined shape and may be a variable part detachably provided on the front body module and the rear part of the under body.

The joint unit may engage the front body module and the rear body module along the vehicle width direction and the vertical direction.

A joint structure of a vehicle body according to an exemplary embodiment of the present invention may include a front body module including a front side structure, a front roof structure, and a front floor structure connected to each other and connected to the front part of an under body, a rear body module including a rear side structure, a rear roof structure, and a rear floor structure connected to each other and connected to the rear part of the under body, and a joint unit connecting the outside and inside of the front body module and the rear body module in the front-to-back direction of the vehicle body.

The joint unit may include a side outer joint bracket connecting the front side structure and the rear side structure in the front-to-back direction of the vehicle body on the outside of the front body module and the rear body module, a roof outer joint bracket that is connected to the side outer joint bracket and connects the front roof structure and the rear roof structure in the front-to-back direction of the vehicle body on the outside of the front body module and the rear body module, a plurality of inner joint brackets connecting the front side structure and the rear side structure, the front roof structure and the rear roof structure, and the front floor structure and the rear floor structure in the front-to-back direction of the vehicle body on the inside of the front body module and the rear body module, and a fastening member that engages the side outer joint bracket, the roof outer joint bracket, and the plurality of inner joint brackets.

The front side structure may include a front side inner member, a front side reinforcement member, and a front side outer member connected to each other.

The rear side structure may include a rear side inner member, a rear side reinforcement member, and a rear side outer member connected to each other.

The joint unit may include a side outer joint bracket supporting the front side outer member and the rear side outer member and at least one side inner joint bracket connected to the front side inner member and the rear side inner member by bolting and engaged to the side outer joint bracket along the vehicle width direction by a fastening member.

The joint unit may further include a first sealing member mounted between the side outer joint bracket, the front side outer member, and the rear side outer member.

The front roof structure may include a front roof inner member, a front roof outer member, and a front roof panel connected to each other.

The rear roof structure may include a rear roof inner member, a rear roof outer member, and a rear roof panel connected to each other.

The joint unit may include a roof outer joint bracket supporting the front roof panel and the rear roof panel and at least one roof inner joint bracket connected to the front roof inner member and the rear roof inner member by bolting and engaged with the roof outer joint bracket along a vertical direction by a fastening member.

The joint unit may further include a second sealing member mounted between the roof outer joint bracket, the front roof panel, and the rear roof panel.

The joint unit may further include an upper overlap inner joint bracket connected to the front side inner member and the rear side inner member and to the front roof inner member and the rear roof inner member by bolting, connected to the side outer joint bracket along a vehicle width direction by a fastening member, and connected to the roof outer joint bracket along a vertical direction.

The front floor structure may include a front cross member and a front floor panel connected to each other.

The rear floor structure may include a rear cross member and a rear floor panel connected to each other.

The joint unit may include a first lower overlap inner joint bracket connected to the front side inner member and the rear side inner member and to the front floor panel and the rear floor panel by welding.

The joint unit may further include a second lower overlap inner joint bracket overlapped with the first lower overlap inner bracket, connected to the front side inner member and the rear side inner member and to the front floor panel and the rear floor panel by bolts, and engaged with the side outer joint bracket along the vehicle width direction by a fastening member.

The front floor panel and the rear floor panel may be overlapped with the first lower overlap inner joint bracket and the second lower overlap inner joint bracket along the vertical direction.

The joint unit may further include a third lower overlap inner joint bracket engaged with the front side sill and the rear side sill and engaged with the front floor panel and the rear floor panel by bolts.

The front floor panel, the rear floor panel, the first lower overlap inner joint bracket, the second lower overlap inner joint bracket, and the third lower overlap inner joint bracket may be engaged along the vertical direction by a fastening member.

The joint structure according to an exemplary embodiment may further include a side molding trim connected to the front side outer member and the rear side outer member to seal between the front side structure and the rear side structure and a roof molding trim connected to the front roof panel and the rear roof panel to seal between the front roof structure and the rear roof structure.

The side molding trim may include a fitting step portion formed on the upper end.

The roof molding trim may include a connecting portion connected to the fitting step portion along a vertical direction.

According to the exemplary embodiments of the present invention, cost reduction can be achieved by changing the upper body structure of the vehicle body to suit various customized services of the PBV.

In addition, the effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are for reference in explaining exemplary embodiments of the present invention, the technical idea of the embodiments of the present invention should not be construed as being limited to the accompanying drawings.

FIG. 2 to FIG. 4 are partial perspective views showing the joint structure of a vehicle body according to an exemplary embodiment.

FIG. 6 is a cross-sectional view along line A-A in FIG. 2.

FIG. 8 is a cross-sectional view along line C-C in FIG. 3.

Figure 1:
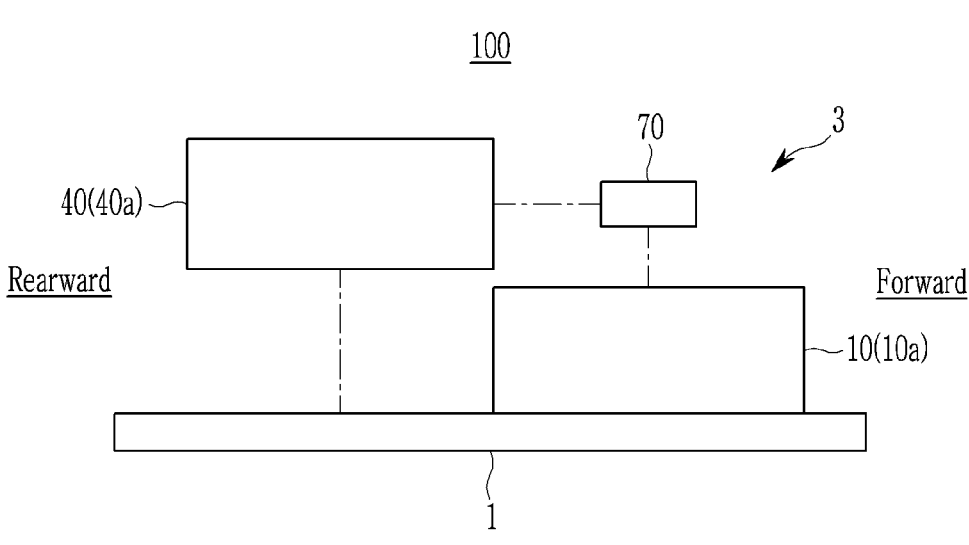
FIG. 1 is a block diagram schematically showing a joint structure of a vehicle body according to an exemplary embodiment.

The following reference identifiers may be used in connection with the drawings to describe features of embodiments of the present disclosure.

| | |
|---|---|
| 1: under body | 3: upper body |
| 10: front body module | 10a: fixed part |
| 11: front side structure | 11a: front side sill |
| 13: front side inner member | 15: front side reinforcement member |
| 17: front side outer member | 19: first closed section |
| 21: front roof structure | 23: front roof inner member |
| 25: front roof outer member | 27: front roof panel |
| 29: third closed section | 31: front floor structure |
| 33: front cross member | 35: front floor panel |
| 39: fifth closed section | 40: rear body module |
| 40a: variable part | 41: rear side structure |
| 41a: rear side sill | 43: rear side inner member |
| 45: rear side reinforcement member | 47: rear side outer member |
| 49: second closed section | 51: rear roof structure |
| 53: rear roof inner member | 55: rear roof outer member |
| 57: rear roof panel | 59: fourth closed section |
| 61: rear floor structure | 63: rear cross member |
| 65: rear floor panel | 69: sixth closed section |
| 70: joint unit | 71: side outer joint bracket |
| 73: first forming portion | 75: first sealing member |
| 81: roof outer joint bracket | 83: third forming portion |
| 85: second sealing member | 100: joint structure of a vehicle |
| 110: side inner joint bracket | 111: second forming portion |
| 120: roof inner joint bracket | 121: fourth forming portion |
| 130: upper overlap inner joint bracket | 131: fifth forming portion |
| 140: first lower overlap inner joint bracket | |
| 150: second lower overlap inner joint bracket | |
| 160: third lower overlap inner joint bracket | 170: side molding trim |
| 171: fitting step portion | 180: roof molding trim |
| 181: connecting portion | 190: fastening member |
| Bx: bolt | Nx: nut |

The drawings referenced above are not necessarily drawn to scale, but should be understood as presenting rather simplified representations of various preferred features illustrating the basic principles of embodiments of the present invention. For example, specific design features of embodiments of the present invention, including specific dimensions, directions, positions, and shapes, will be determined in part by specific intended applications and use environments.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the embodiments of the present invention.

The terminology used herein is for the purpose of describing specific exemplary embodiments only and is not intended to limit the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements, and/or components, but it does not exclude the presence or addition of one or more other features, integers, steps, operations, components, and/or groups thereof.

As used in this specification, the term 'and/or' includes any one or all combinations of at least one of the associated listed items.

In this specification, the term 'connected' indicates a physical relationship between two components, for example, a physical relationship in which components are directly connected to each other by welding, self piercing rivet (SPR), flow drill screw (FDS), structural adhesive, or the like, or it indicates components that are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (purpose built vehicles), hydrogen-powered vehicles, and other alternative fuel vehicles (e.g., other than petroleum fuel derived from resources).

Hereinafter, embodiments of the present invention will be described in detail with reference to the accompanying drawings.

FIG. 1 is a block diagram schematically showing a joint structure of a vehicle body according to an exemplary embodiment.

Referring to FIG. 1, a joint structure 100 of a vehicle body according to an exemplary embodiment may be applied to, for example, a vehicle body of a purpose-based mobility vehicle (purpose built vehicle: hereinafter referred to as a 'PBV').

In one example, the PBV may be used as an electric vehicle-based life module vehicle that provides various services to occupants while moving from one place to a destination in an unmanned self-driving manner.

In one example, the PBV may be manufactured with a one box type design having a large interior space.

In addition, the PBV may apply a facing type seat to provide a wide interior space.

The vehicle body of the PBV is suitable for small-volume production of various vehicle types with a small number of parts and can be manufactured in various shapes and sizes.

The vehicle body of the PBV includes a skateboard type under body 1 (commonly referred to as a 'rolling chassis' or 'chassis frame' by those skilled in the art) and an upper body 3 assembled to the under body 1.

The under body 1 may be equipped with a battery assembly and a drive motor. And the upper body 3 is a body in white (BIW) body connected to the under body 1 and may constitute a cabin with a wide indoor space.

In this specification, the 'front-to-back direction of the vehicle body' may be defined as the longitudinal direction of the vehicle body, the 'vehicle width direction' may be defined as the left-right direction of the vehicle body, and the 'up-and-down direction' or the 'vertical direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', ' lower portion', or ' lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion or other (another) end portion, etc.) denotes a portion of a component that includes that end.

The joint structure 100 of a vehicle body according to an exemplary embodiment may be a structure that may be applied to connect various types of upper bodies 3 to the under body 1 according to the type of customized service of the PBV.

The joint structure 100 according to an exemplary embodiment includes a front body module 10 and a rear body module 40 assembled to the under body 1. And the joint structure 100 according to an exemplary embodiment includes a joint unit 70.

Figure 2:
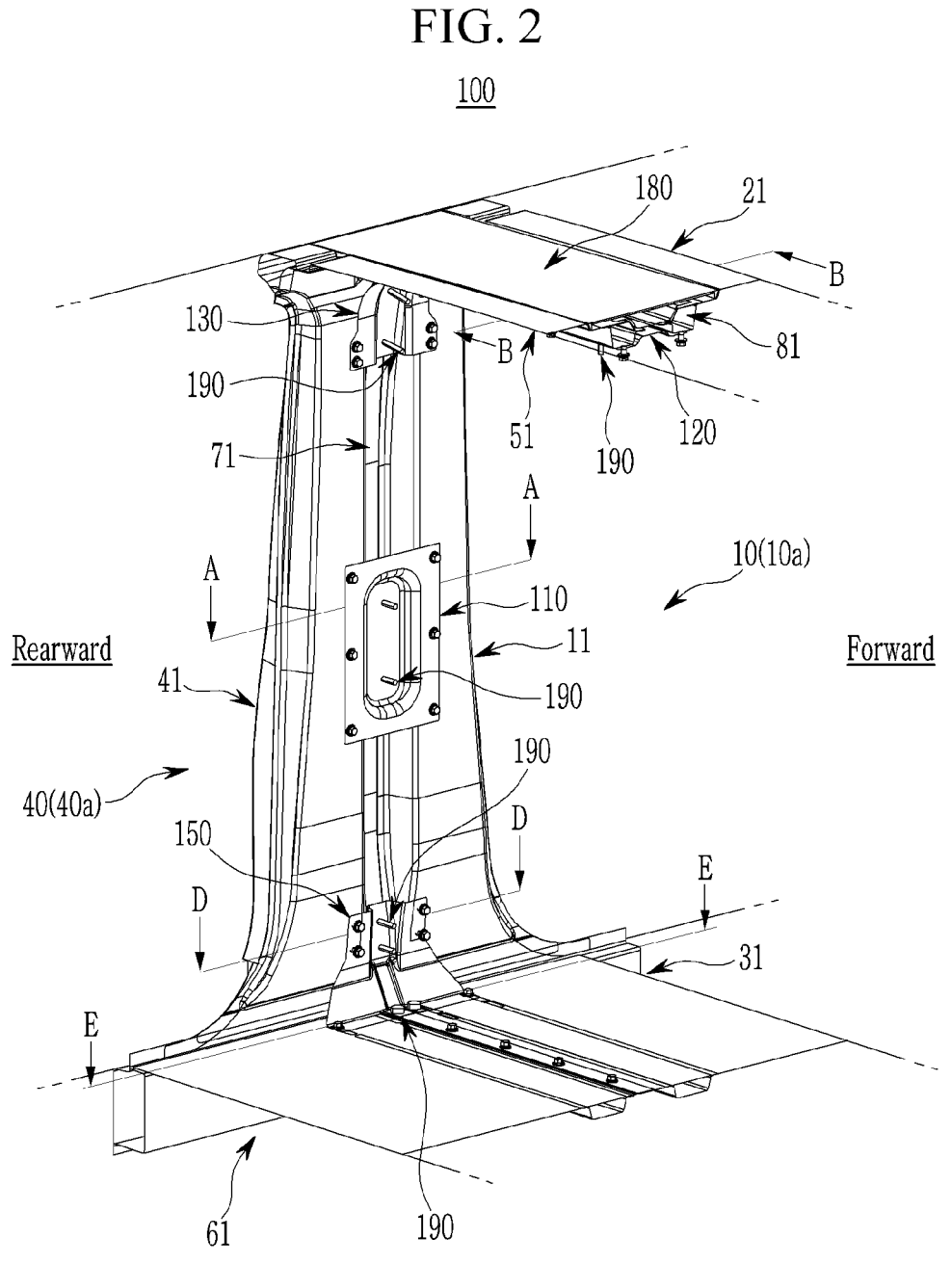
Figure 3:
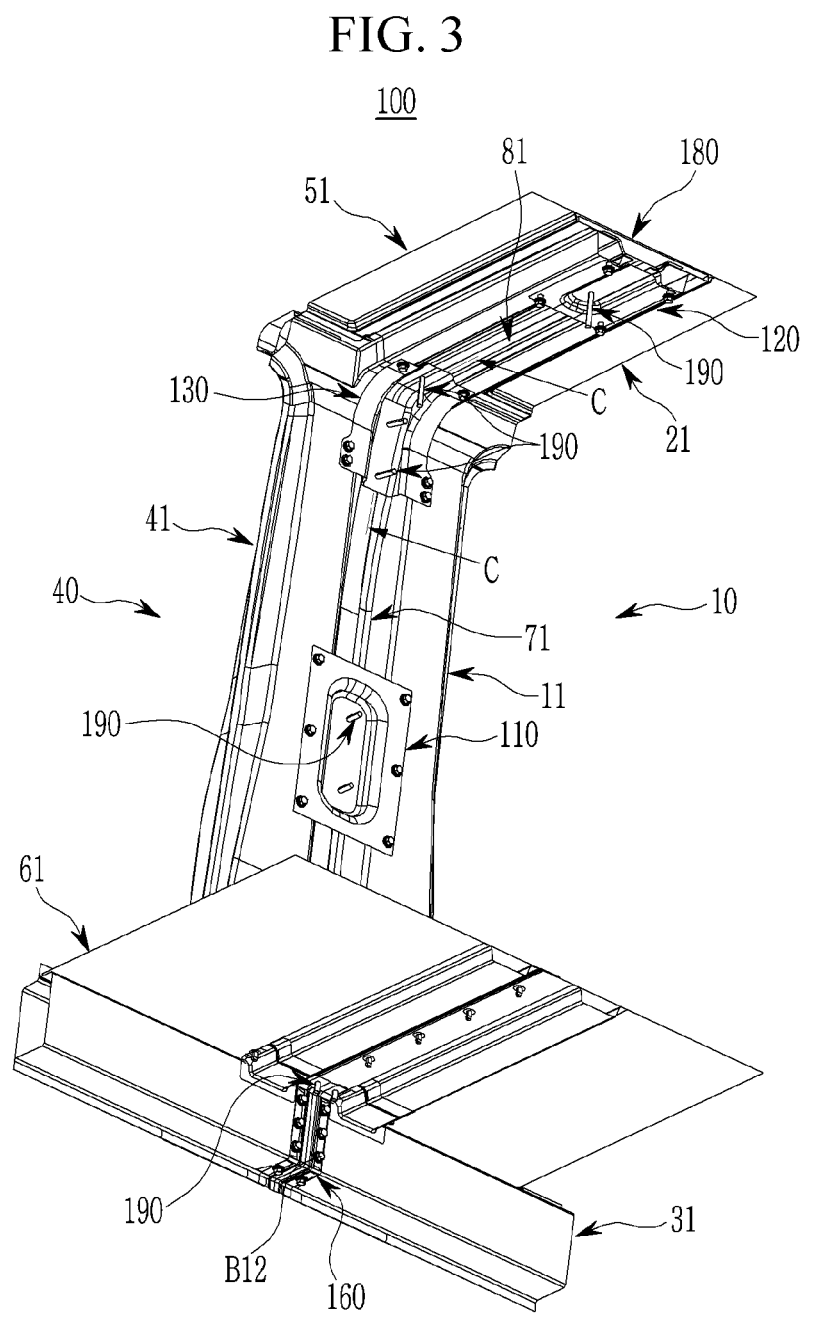
Figure 4:
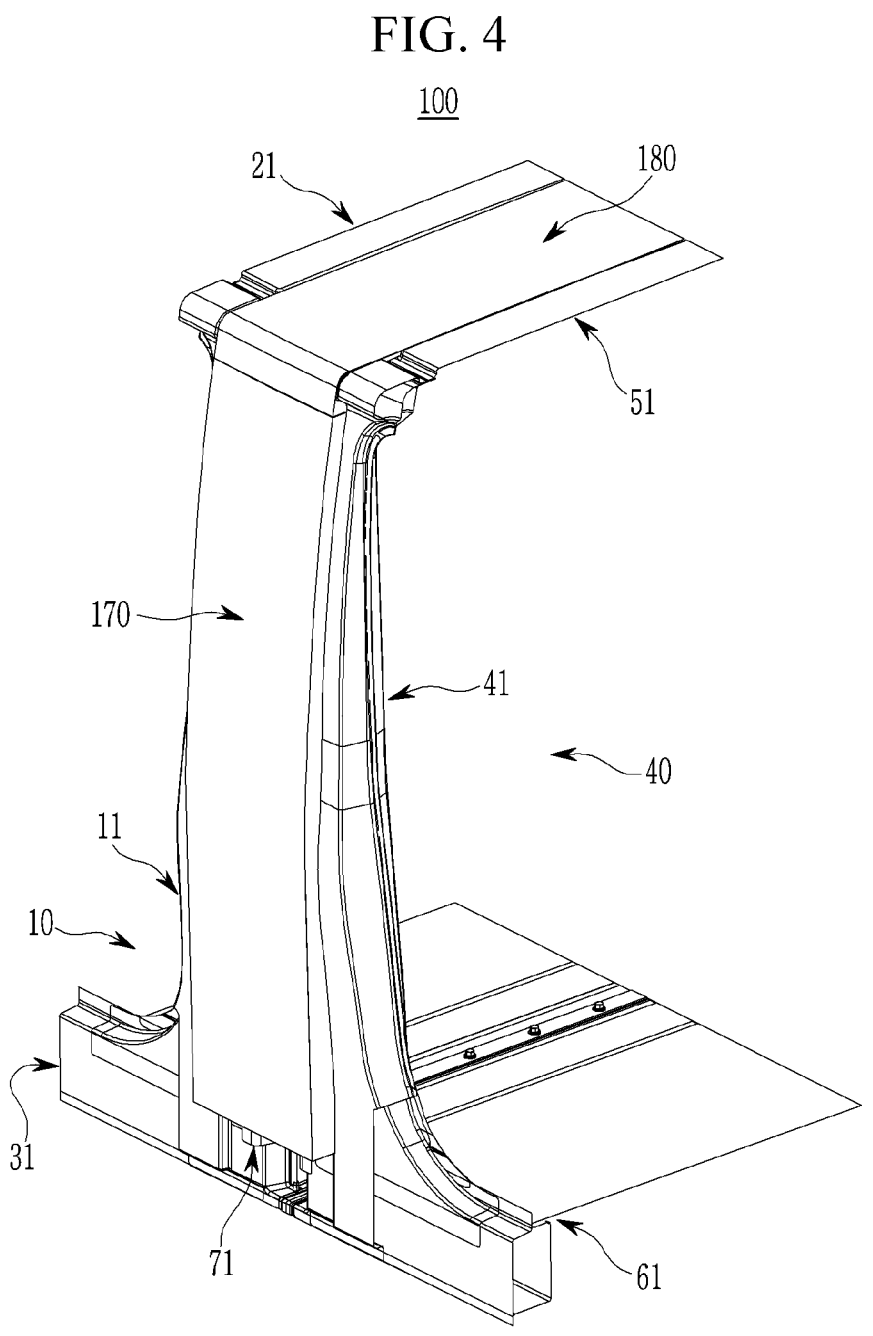
Figure 5:
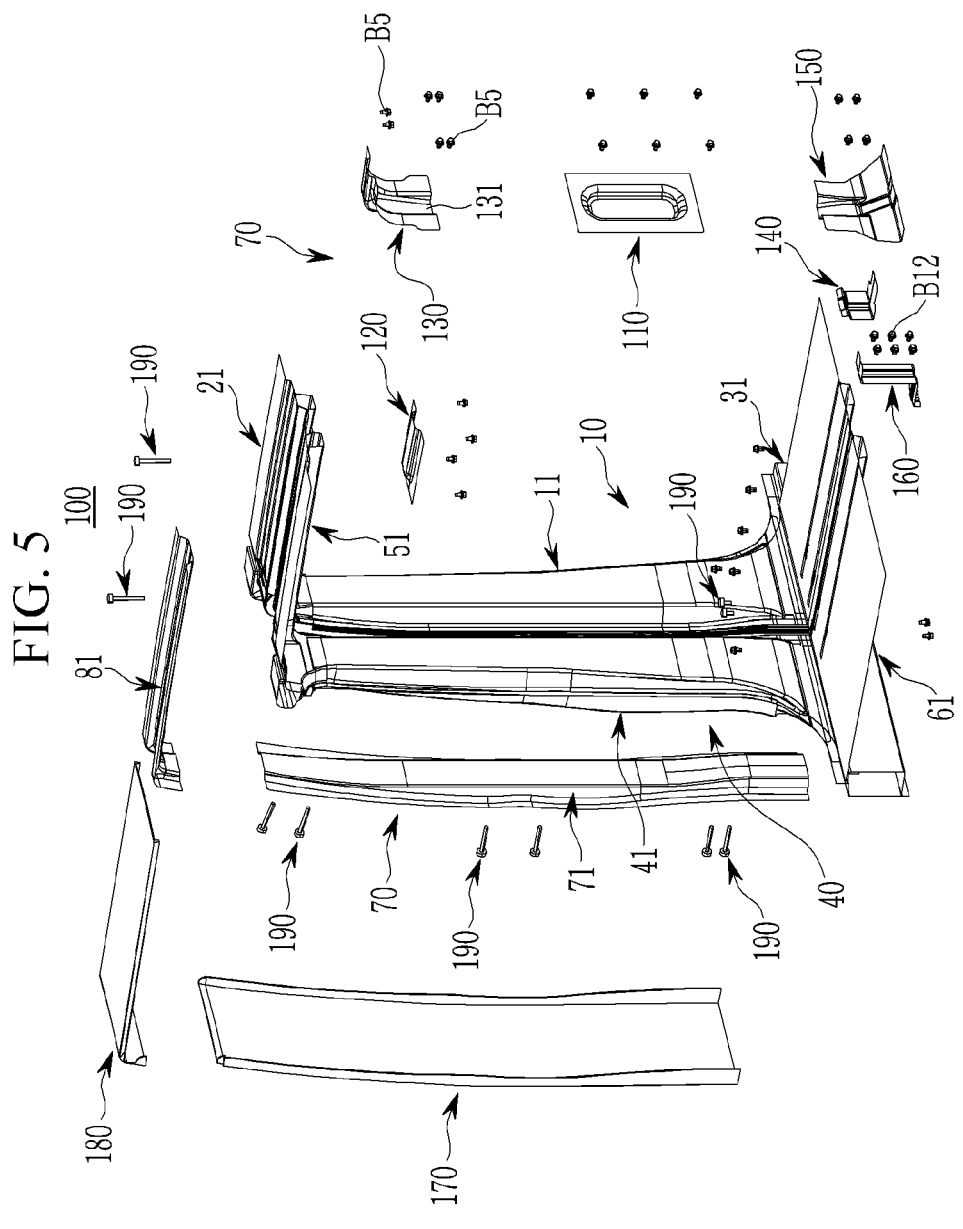
FIG. 5 is an exploded perspective view showing the joint structure of a vehicle body according to an exemplary embodiment.

FIG. 2 to FIG. 4 are partial perspective views showing the joint structure of a vehicle body according to an exemplary embodiment, and FIG. 5 is an exploded perspective view showing the joint structure of a vehicle body according to an exemplary embodiment.

FIG. 2 to FIG. 5 show only one side of the vehicle body, the rear of the front body module 10, and the front of the rear body module 40.

Referring to FIG. 1 to FIG. 5, in an exemplary embodiment, the front body module 10 includes a cab type front cabin. The front body module 10 may be connected to the front part of the under body 1.

The front body module 10 may be connected along a vertical direction to the front part of the under body 1 through a vehicle body mounting unit known to a person of ordinary skill in the art. The front body module 10 may be provided with a fixed part 10a (see FIG. 2) fixed to the front part of the under body 1.

The front body module 10 includes a front side structure 11, a front roof structure 21, and a front floor structure 31 connected to each other.

The front side structure 11 is provided on both sides of the front body module 10 along the vehicle width direction. The front roof structure 21 connects the upper portion of the front side structure 11 along the vehicle width direction. The front floor structure 31 connects the lower portion of the front side structure 11 along the vehicle width direction.

In an exemplary embodiment, the rear body module 40 includes a rear cabin or luggage room. The rear body module 40 may be connected to the rear part of the under body 1.

The rear body module 40 may be connected along a vertical direction to the rear part of the under body 1 through a vehicle body mounting unit known to a person of ordinary skill in the art. The rear body module 40 has a predetermined shape and may be a variable part 40a (see FIG. 2) detachably provided on the front body module 10.

The rear body module 40 may form a rear cabin at the rear of the vehicle body, and the rear body module 40 may form an upper body 3 of a hailing type together with the front body module 10.

The rear body module 40 may form a luggage room at the rear of the vehicle body, and the rear body module 40 may form a delivery type upper body 3 together with the front body module 10.

The rear body module 40 includes a rear side structure 41, a rear roof structure 51, and a rear floor structure 61 connected to each other.

The rear side structure 41 is provided on both sides of the rear body module 40 along the vehicle width direction. The rear roof structure 51 connects the upper portion of the rear side structure 41 along the vehicle width direction. The rear floor structure 61 connects the lower portion of the rear side structure 41 along the vehicle width direction.

In an exemplary embodiment, the joint unit 70 is configured to connect the front body module 10 and the rear body module 40 in the front-to-back direction of the vehicle body. The joint unit 70 may connect the outside and the inside of the front body module 10 and the rear body module 40 in the front-to-back direction of the vehicle body.

The joint unit 70 may engage the front body module 10 and the rear body module 40 along the vehicle width direction and the vertical direction.

The joint unit 70 according to an exemplary embodiment includes a side outer joint bracket 71, a roof outer joint bracket 81, a plurality of inner joint brackets (110, 120, 130, 140, 150, 160), and a fastening member 190. The configuration of the joint unit 70 will be described in more detail later.

Hereinafter, the configurations of the front side structure 11, the front roof structure 21, and the front floor structure 31 of the front body module 10, and the rear side structure 41, the rear roof structure 51, and the rear floor structure 61 of the rear body module 40 will be described in detail with reference to accompanying drawings.

In addition, hereinafter, the configuration of the joint unit 70 as described above and the connection structure of the front body module 10 and the rear body module 40 engaged by the joint unit 70 will be described in detail with reference to accompanying drawings.

Figure 6:
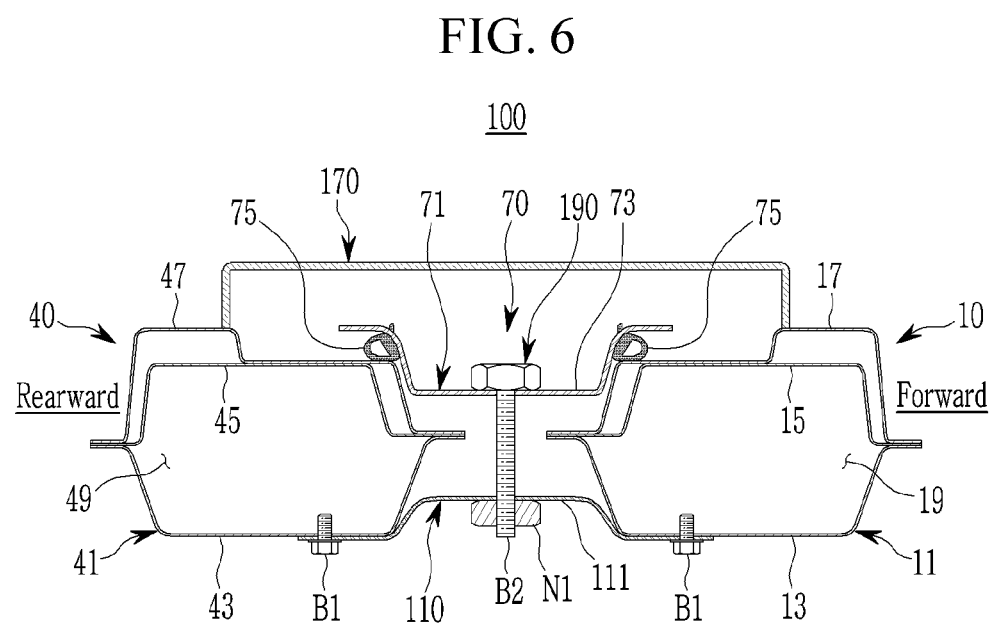

FIG. 6 is a cross-sectional view along line A-A in FIG. 2.

Referring to FIG. 2 to FIG. 6, the front side structure 11 of the front body module 10 according to an exemplary embodiment includes a front side inner member 13, a front side reinforcement member 15, and a front side outer member 17 connected to each other.

The front side inner member 13 and the front side outer member 17 may be connected to the front side reinforcement member 15 by welding (e.g., three-layer welding) with the front side reinforcement member 15 interposed therebetween. The front side reinforcement member 15 is configured to reinforce the strength of the front side structure 11.

The front side inner member 13, the front side reinforcement member 15, and the front side outer member 17 connected to each other may form a closed cross-section. At least one first closed section 19 may be formed between the front side inner member 13 and the front side outer member 17 through the front side reinforcement member 15.

Referring to FIG. 2 to FIG. 6, the rear side structure 41 of the rear body module 40 according to an exemplary embodiment includes a rear side inner member 43, a rear side reinforcement member 45, and a rear side outer member 47 connected to each other.

The rear side inner member 43 and the rear side outer member 47 may be connected to the rear side reinforcement member 45 by welding (e.g., three-point welding) with the rear side reinforcement member 45 interposed therebetween. The rear side reinforcement member 45 is configured to reinforce the strength of the rear side structure 41.

The rear side inner member 43, the rear side reinforcement member 45, and the rear side outer member 47 connected to each other may form a closed cross-section. At least one second closed section 49 may be formed between the rear side inner member 43 and the rear side outer member 47 through the rear side reinforcement member 45.

Referring to FIG. 2 to FIG. 6, the joint unit 70 according to an exemplary embodiment is configured to connect the front side structure 11 of the front body module 10 and the rear side structure 41 of the rear body module 40 in the front-to-back direction of the vehicle body from outside and inside of the front body module 10 and the rear body module 40.

The joint unit 70 includes the side outer joint bracket 71, the side inner joint bracket 110, and the fastening member 190.

The side outer joint bracket 71 connects the front side structure 11 and the rear side structure 41 in the front-to-back direction of the vehicle body from the outside of the front body module 10 and the rear body module 40.

The side outer joint bracket 71 may support or connect the front side outer member 17 of the front side structure 11 and the rear side outer member 47 of the rear side structure 41.

The side outer joint bracket 71 may support the front side outer member 17 and the rear side outer member 47 through both ends in the front-to-back direction of the vehicle body.

The side outer joint bracket 71 includes a first forming portion 73 formed between both ends. The first forming portion 73 may be formed in a concave shape from the outside to the inside of the front body module 10 and the rear body module 40.

The joint unit 70 according to an exemplary embodiment further includes a first sealing member 75.

The first sealing member 75 is configured to seal between the side outer joint bracket 71 and the front side outer member 17 and between the side outer joint bracket 71 and the rear side outer member 47.

The first sealing member 75 is mounted between the side outer joint bracket 71 and the front side outer member 17 and between the side outer joint bracket 71 and the rear side outer member 47. In one example, the first sealing member 75 may include a weather strip of a rubber material known to a person of ordinary skill in the art.

In another example, the first sealing member 75 may be bonded between the side outer joint bracket 71 and the front side outer member 17 and between the side outer joint bracket 71 and the rear side outer member 47 through an adhesive (not shown).

The side outer joint bracket 71 may be fixed to the front side outer member 17 and the rear side outer member 47 through the first sealing member 75.

On the other hand, the at least one side inner joint bracket 110 connects the front side structure 11 and the rear side structure 41 at the inside of the front body module 10 and the rear body module 40 in the front-to-back direction of the vehicle body.

The at least one side inner joint bracket 110 is connected to the front side inner member 13 of the front side structure 11 and the rear side inner member 43 of the rear side structure 41. The at least one side inner joint bracket 110 may be connected to the front side inner member 13 and the rear side inner member 43 through both ends in the front-to-back direction of the vehicle body.

The at least one side inner joint bracket 110 may be connected (e.g., engaged) to the front side inner member 13 and the rear side inner member 43 along the vehicle width direction by a plurality of bolts B1.

The at least one side inner joint bracket 110 includes a second forming portion 111 formed between both ends. The second forming portion 111 may be formed in a concave shape from the inside to the outside of the front body module 10 and the rear body module 40.

The at least one side inner joint bracket 110 may be engaged with the side outer joint bracket 71 along the vehicle width direction by the fastening member 190.

The fastening member 190 may engage the first forming portion 73 of the side outer joint bracket 71 and the second forming portion 111 of at least one side inner joint bracket 110 along the vehicle width direction. The fastening member 190 may include, for example, a combination of a plurality of bolts B2 and a plurality of nuts N1.

The side outer joint bracket 71, at least one side inner joint bracket 110, and the front side structure 11 and the rear side structure 41 connected in the front-to-back direction of the vehicle body by the fastening member 190 may be configured as a vehicle body filler assembly (e.g., a center pillar assembly).

As the filler assembly forms at least one first closed section 19 on the front side structure 11 and at least one second closed section 49 on the rear side structure 41, crash performance and torsional strength may be increased.

Figure 7:
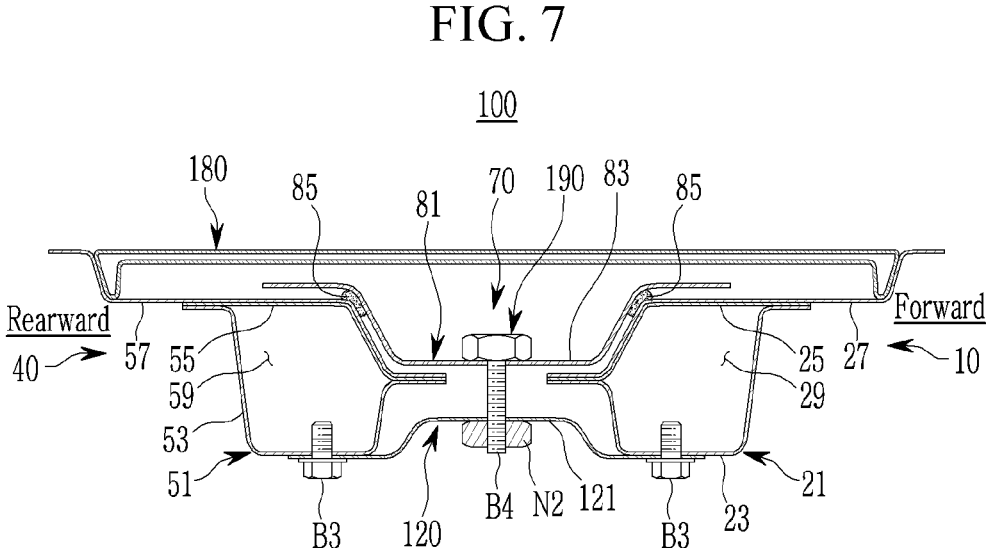
FIG. 7 is a cross-sectional view along line B-B in FIG. 2.

FIG. 7 is a cross-sectional view along line B-B in FIG. 2.

Referring to FIG. 2 to FIG. 5 and FIG. 7, the front roof structure 21 of the front body module 10 according to an exemplary embodiment includes a front roof inner member 23, a front roof outer member 25, and a front roof panel 27 connected to each other.

The front roof inner member 23, the front roof outer member 25, and the front roof panel 27 may be connected by welding (e.g., 3-layer welding). The front roof panel 27 may be connected to an upper portion of the front roof outer member 25.

The front roof inner member 23 and the front roof outer member 25 connected to each other may form a closed cross-section. At least one third closed section 29 may be formed between the front roof inner member 23 and the front roof outer member 25.

Referring to FIG. 2 to FIG. 5 and FIG. 7, the rear roof structure 51 of the rear body module 40 according to an exemplary embodiment includes a rear roof inner member 53, a rear roof outer member 55, and a rear roof panel 57 connected to each other.

The rear roof inner member 53, the rear roof outer member 55, and the rear roof panel 57 may be connected by welding (e.g., 3-layer welding). The rear roof panel 57 may be connected to an upper portion of the rear roof outer member 55.

The rear roof inner member 53 and the rear roof outer member 55 connected to each other may form a closed cross-section. At least one fourth closed section 59 may be formed between the rear roof inner member 53 and the rear roof outer member 55.

Referring to FIG. 2 to FIG. 5 and FIG. 7, the joint unit 70 according to an exemplary embodiment is configured to connect the front roof structure 21 of the front body module 10 and the rear roof structure 51 of the rear body module 40 in the front-to-back direction of the vehicle body from outside and inside of the front body module 10 and the rear body module 40.

The joint unit 70 includes the above-mentioned roof outer joint bracket 81, the roof inner joint bracket 120, and the fastening member 190.

The roof outer joint bracket 81 connects the front roof structure 21 and the rear roof structure 51 in the front-to-back direction of the vehicle body from the outside of the front body module 10 and the rear body module 40.

The roof outer joint bracket 81 may support or connect the front roof panel 27 of the front roof structure 21 and the rear roof panel 57 of the rear roof structure 51.

The roof outer joint bracket 81 may support the front roof panel 27 and the rear roof panel 57 through both ends along the front-to-back direction of the vehicle body. The roof outer joint bracket 81 may be connected to the side outer joint bracket 71 (see FIG. 6) by welding.

The roof outer joint bracket 81 includes a third forming portion 83 formed between both ends. The third forming portion 83 may be formed in a concave shape from the outside to the inside of the front body module 10 and the rear body module 40, that is, from the upper side to the lower side.

The joint unit 70 according to an exemplary embodiment further includes a second sealing member 85.

The second sealing member 85 is configured to seal between the roof outer joint bracket 81 and the front roof panel 27 and between the roof outer joint bracket 81 and the rear roof panel 57.

The second sealing member 85 is mounted between the roof outer joint bracket 81 and the front roof panel 27 and between the roof outer joint bracket 81 and the rear roof panel 57. In one example, the second sealing member 85 may include a weather strip of a rubber material known to a person of ordinary skill in the art.

In another example, the second sealing member 85 may be bonded between the roof outer joint bracket 81 and the front roof panel 27 and between the roof outer joint bracket 81 and the rear roof panel 57 through an adhesive (not shown).

The roof outer joint bracket 81 may be fixed to the front roof panel 27 and the rear roof panel 57 through the second sealing member 85.

The at least one roof inner joint bracket 120 connects the front roof structure 21 and the rear roof structure 51 inside the front body module 10 and the rear body module 40 in the front-to-back direction of the vehicle body.

The at least one roof inner joint bracket 120 is connected to the front roof inner member 23 of the front roof structure 21 and the rear roof inner member 53 of the rear roof structure 51. The at least one roof inner joint bracket 120 may be connected to the front roof inner member 23 and the rear roof inner member 53 through both ends in the front-to-back direction of the vehicle body.

The at least one roof inner joint bracket 120 may be connected (e.g., engaged) to the front roof inner member 23 and the rear roof inner member 53 along the vertical direction by a plurality of bolts B3.

The at least one roof inner joint bracket 120 includes a fourth forming portion 121 formed between both ends. The fourth forming portion 121 may be formed in a concave shape from the inside to the outside of the front body module 10 and the rear body module 40, that is, from the bottom to the top.

The at least one roof inner joint bracket 120 may be engaged with the roof outer joint bracket 81 along the vertical direction by the fastening member 190.

The fastening member 190 may engage the third forming portion 83 of the roof outer joint bracket 81 and the fourth forming portion 121 of the roof inner joint bracket 120 in a vertical direction. The fastening member 190 may include, for example, a combination of a plurality of bolts B4 and a plurality of nuts N2.

The front roof structure 21 and the rear roof structure 51 connected in the front-to-back direction of the vehicle body by the roof outer joint bracket 81, the roof inner joint bracket 120, and the fastening member 190 are the roof rail assembly of the vehicle body (e.g., a center roof rail assembly).

As the roof rail assembly forms at least one third closed section 29 on the front roof structure 21 and at least one fourth closed section 59 on the rear roof structure 51, crash performance and torsional strength may be increased.

Figure 8:
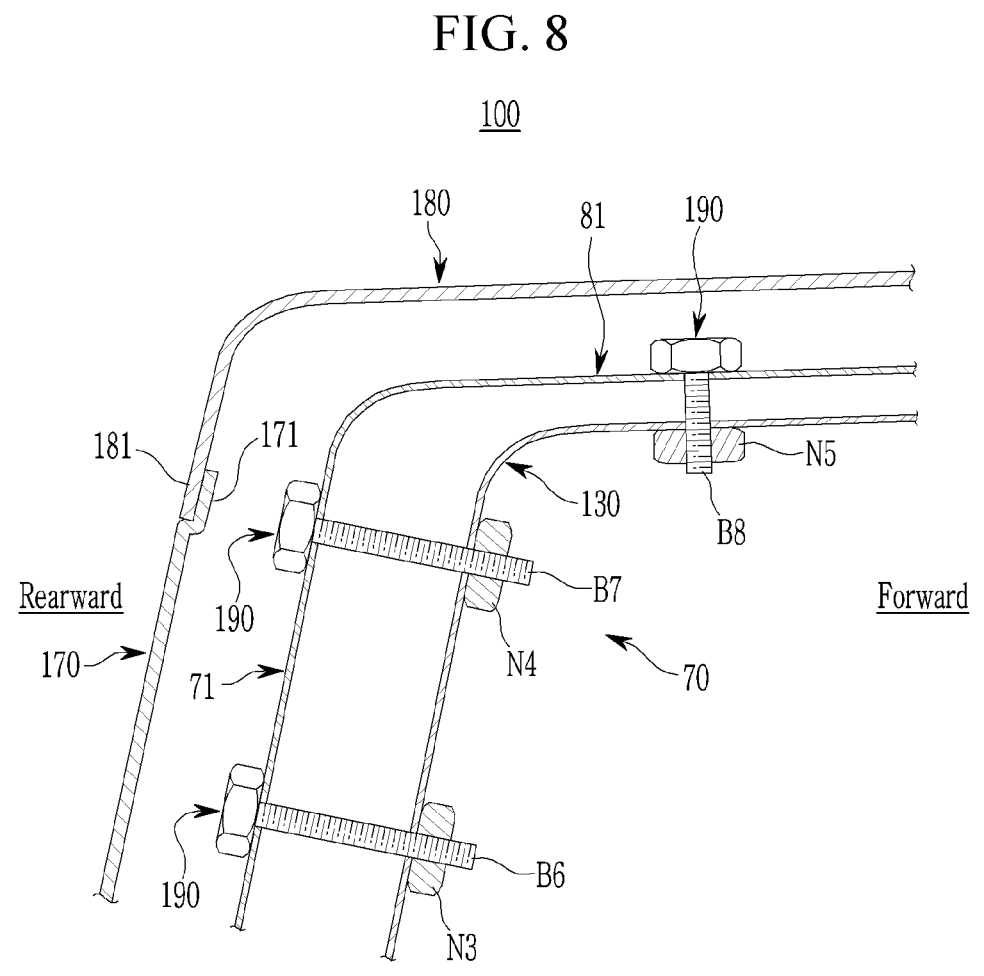

FIG. 8 is a cross-sectional view along line C-C in FIG. 3.

Referring to FIG. 2 to FIG. 5 and FIG. 8, the joint unit 70 according to an exemplary embodiment includes an upper overlap inner joint bracket 130.

The upper overlap inner joint bracket 130 may be mounted in an overlap section, that is, the upper corners of the front side structure 11 and the front roof structure 21 connected to each other and of the rear side structure 41 and the rear roof structure 51 connected to each other.

The upper overlap inner joint bracket 130 may be connected to the front side inner member 13 and the rear side inner member 43 (see FIG. 6) and connected to the front roof inner member 23 and the rear roof inner member 53 (see FIG. 7) in the inner overlap section of the front body module 10 and the rear body module 40 (e.g., an upper corner).

The upper overlap inner joint bracket 130 may be connected to the front side inner member 13 and the rear side inner member 43 and to the front roof inner member 23 and the rear roof inner member 53 through both ends in the front-to-back direction of the vehicle body.

That is, the upper overlap inner joint bracket 130 is connected to the front side inner member 13 and the rear side inner member 43 along the vehicle width direction and to the front roof inner member 23 and the rear roof inner member 53 along the vertical direction.

The upper overlap inner joint bracket 130 is connected to the front side inner member 13, the rear side inner member 43, the front roof inner member 23, and the rear roof inner member 53 by a plurality of bolts (see B5 in FIG. 5) along the vehicle width direction and the vertical direction.

The upper overlap inner joint bracket 130 may be formed in a curved shape in a round shape along the overlap section (e.g., an upper corner). The upper overlap inner joint bracket 130 includes a fifth forming portion 131 (see FIG. 5) formed between both ends. The fifth forming portion 131 may be formed in a concave shape from the inside to the outside of the front body module 10 and the rear body module 40.

The upper overlap inner joint bracket 130 may be engaged with the side outer joint bracket 71 along the vehicle width direction and may be engaged with the roof outer joint bracket 81 along the vertical direction by the fastening member 190.

The fastening member 190 may engage the first forming portion 73 (see FIG. 6) of the side outer joint bracket 71 and the fifth forming portion 131 of the upper overlap inner joint bracket 130 along the vehicle width direction.

Also, the fastening member 190 may engage the third forming portion 83 (see FIG. 7) of the roof outer joint bracket 81 and the fifth forming portion 131 of the upper overlap inner joint bracket 130 along a vertical direction.

The fastening member 190 may include, for example, a combination of a plurality of bolts B6, B7, and B8 and a plurality of nuts N3, N4, and N5.

Figure 9:
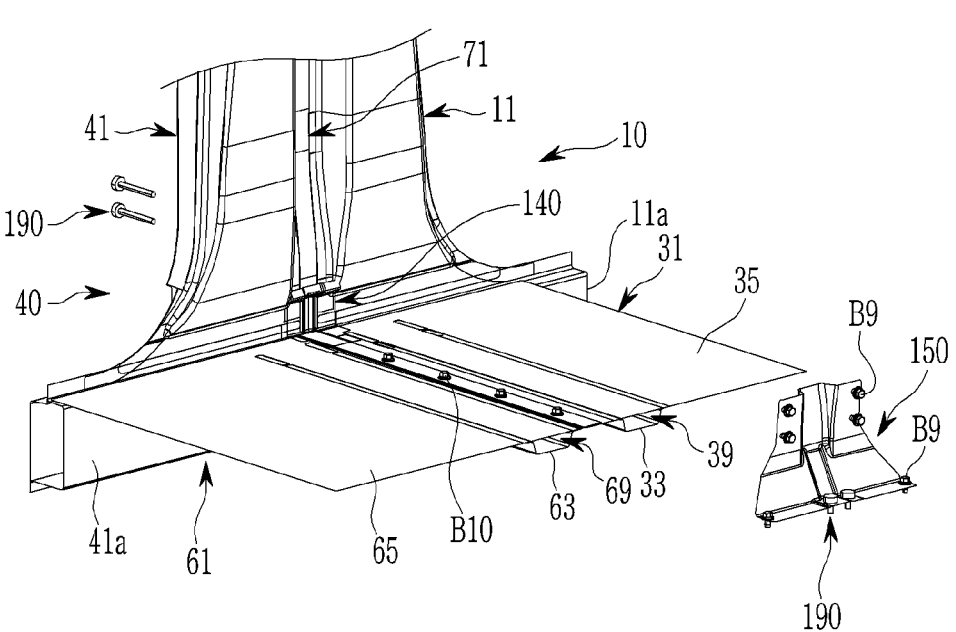
FIG. 9 is an exploded perspective view showing a first lower overlap inner joint bracket and a second lower overlap inner joint bracket applied to the joint structure of a vehicle body according to an exemplary embodiment.
Figure 10:
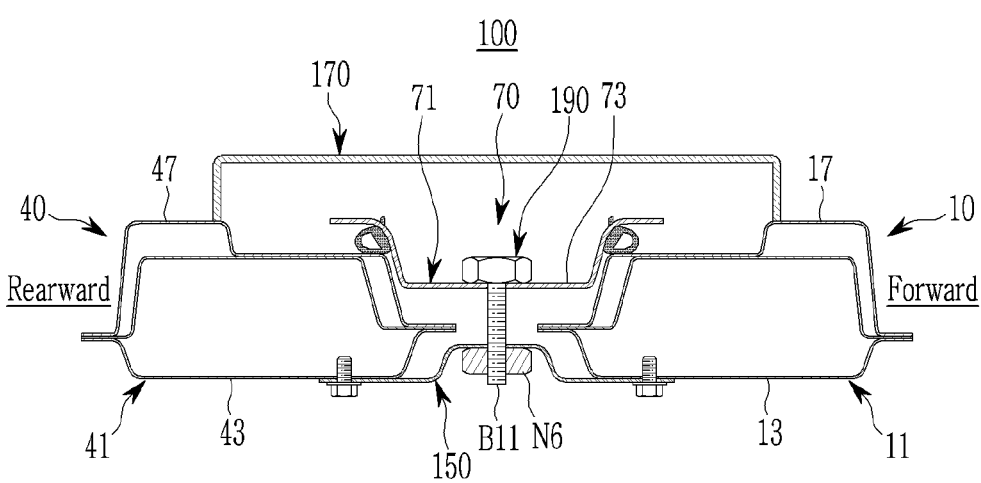
FIG. 10 is a cross-sectional view along line D-D in FIG. 2.
Figure 11:
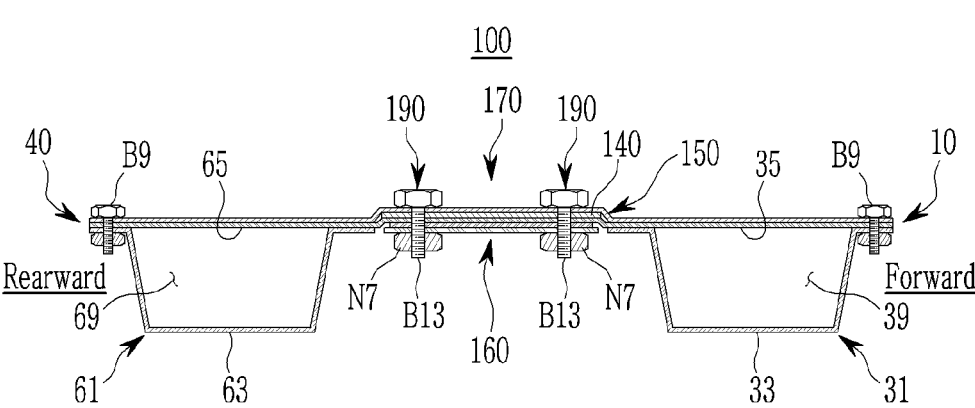
FIG. 11 is a cross-sectional view along line E-E in FIG. 2.

FIG. 9 is an exploded perspective view showing a first lower overlap inner joint bracket and a second lower overlap inner joint bracket applied to the joint structure of a vehicle body according to an exemplary embodiment, FIG. 10 is a cross-sectional view along line D-D in FIG. 2, and FIG. 11 is a cross-sectional view along line E-E in FIG. 2.

Referring to FIG. 2 to FIG. 5 and FIG. 9 to FIG. 11, the front floor structure 31 of the front body module 10 according to an exemplary embodiment includes a front cross member 33 and a front floor panel 35 connected to each other.

The front cross member 33 is disposed along the vehicle width direction to connect the lower portion of the front side structure 11 and is connected to the lower portion of the front side structure 11 by welding.

The front floor panel 35 is connected to the upper portion of the front cross member 33 by welding. The front cross member 33 and the front floor panel 35 may be connected by two-layer welding.

The front cross member 33 and the front floor panel 35 may form a closed cross-section. At least one fifth closed section 39 may be formed between the front cross member 33 and the front floor panel 35.

Referring to FIG. 2 to FIG. 5 and FIG. 9 to FIG. 11, the rear floor structure 61 of the rear body module 40 according to an exemplary embodiment includes a rear cross member 63 and a rear floor panel 65 connected to each other.

The rear cross member 63 is disposed along the vehicle width direction to connect the lower portion of the rear side structure 41 and is connected to the lower portion of the rear side structure 41 by welding.

The rear floor panel 65 is connected to the upper portion of the rear cross member 63 by welding. That is, the rear cross member 63 and the rear floor panel 65 may be connected by two-layer welding.

The rear cross member 63 and the rear floor panel 65 may form a closed cross-section. At least one sixth closed section 69 may be formed between the rear cross member 63 and the rear floor panel 65.

Referring to FIG. 2 to FIG. 5 and FIG. 9 to FIG. 11, the joint unit 70 according to an exemplary embodiment includes a first lower overlap inner joint bracket 140.

The first lower overlap inner joint bracket 140 may be mounted on the lower corner, that is, overlaps of the front side structure 11 and the front floor structure 31 connected to each other through the front side sill 11a and of the rear side structure 41 and the rear floor structure 61 connected to each other through the rear side sill 41a.

The first lower overlap inner joint bracket 140 is connected to the front side inner member 13 and the rear side inner member 43 and to the front floor panel 35 and the rear floor panel 65 in the inner overlap section (e.g., a lower corner) of the front body module 10 and the rear body module 40.

The first lower overlap inner joint bracket 140 may be connected to the front side inner member 13, the rear side inner member 43, the front floor panel 35, and the rear floor panel 65 by welding along the vehicle width direction and the vertical direction.

The first lower overlap inner joint bracket 140 is connected to the front side inner member 13 and the rear side inner member 43 by welding along the vehicle width direction through both ends along the front-to-back direction of the vehicle body. In addition, the first lower overlap inner joint bracket 140 is connected to the front floor panel 35 and the rear floor panel 65 by welding along the vertical direction through both ends along the front-to-back direction of the vehicle body.

That is, as shown in FIG. 5, the first lower overlap inner joint bracket 140 may be formed in an approximate "L" shape.

Referring to FIG. 2 to FIG. 5 and FIG. 9 to FIG. 11, the joint unit 70 according to an exemplary embodiment includes a second lower overlap inner joint bracket 150.

The second lower overlap inner joint bracket 150 may be mounted on the inside of the front body module 10 and the rear body module 40 in the overlap section (e.g., a lower corner) as described above.

The second lower overlap inner joint bracket 150 is overlapped with the first lower overlap inner joint bracket 140 along the vehicle width direction and the vertical direction in the overlap section.

The second lower overlap inner joint bracket 150 may be connected to the front side inner member 13 and the rear side inner member 43 and to the front floor panel 35 and rear floor panel 65.

That is, the second lower overlap inner joint bracket 150 is connected to the front side inner member 13 and the rear side inner member 43 along the vehicle width direction through both ends along the front-to-back direction of the vehicle body. In addition, the second lower overlap inner joint bracket 150 is connected to the front floor panel 35 and the rear floor panel 65 along the vertical direction through both ends in the front-to-back direction of the vehicle body.

The second lower overlap inner joint bracket 150 is connected to the front side inner member 13, the rear side inner member 43, the front floor panel 35, and the rear floor panel 65 along the vehicle width direction and the vertical direction by a plurality of bolts B9.

The front floor panel 35 and the rear floor panel 65 are overlapped with the first lower overlap inner joint bracket 140 and the second lower overlap inner joint bracket 150 along the vertical direction. The rear part of the front floor panel 35 and the front part of the rear floor panel 65 may be engaged along the vertical direction by a plurality of bolts B10 (see FIG. 9).

The second lower overlap inner joint bracket 150 may be engaged with the side outer joint bracket 71 along the vehicle width direction by the fastening member 190.

The fastening member 190 may engage the first forming portion 73 of the side outer joint bracket 71 and the second lower overlap inner joint bracket 150 along the vehicle width direction (see FIG. 10).

The fastening member 190 may include, for example, a combination of a plurality of bolts B11 and a plurality of nuts N6.

Referring to FIG. 2 to FIG. 5 and FIG. 9 to FIG. 11, the joint unit 70 according to an exemplary embodiment includes a third lower overlap inner joint bracket 160.

The third lower overlap inner joint bracket 160 may be connected to the front side sill 11*a* and the rear side sill 41*a* and to the front floor panel 35 and the rear floor panel 65.

The third lower overlap inner joint bracket 160 may be engaged along the vehicle width direction and the vertical direction to the front side sill 11*a* and the rear side sill 41*a* by a plurality of bolts B12 (see FIG. 3 and FIG. 5). The third lower overlap inner joint bracket 160 is overlapped and disposed on the lower portion of the front floor panel 35 and the rear floor panel 65 overlapping each other.

The front floor panel 35, the rear floor panel 65, the first lower overlap inner joint bracket 140, the second lower overlap inner joint bracket 150, and the third lower overlap inner joint bracket 160 overlapping each other may be engaged along the vertical direction by the fastening member 190 (see FIG. 11).

The fastening member 190 may include, for example, a combination of a plurality of bolts B13 and a plurality of nuts N7.

Figure 12:
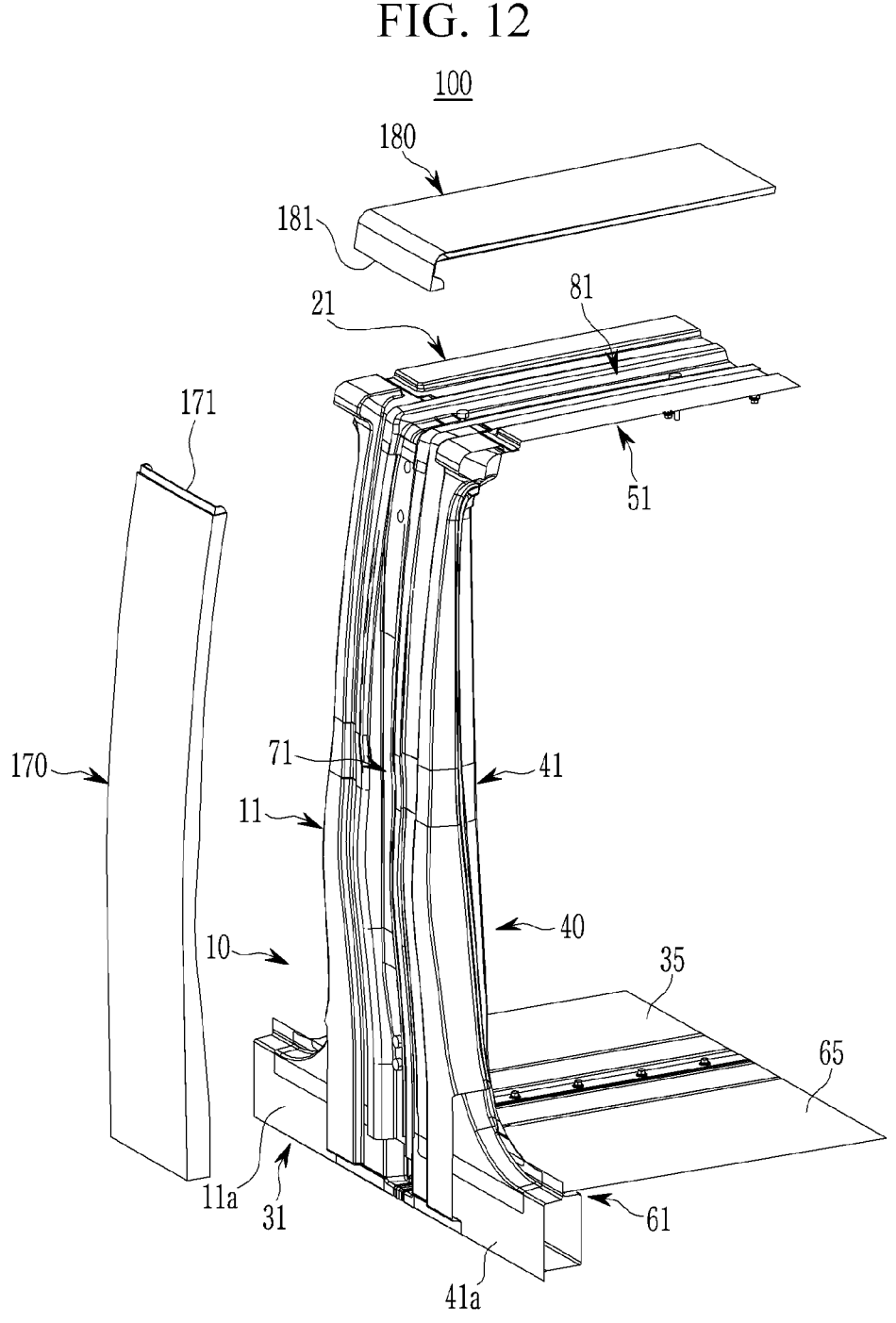
FIG. 12 is an exploded perspective view showing a side molding trim and a roof molding trim applied to the joint structure of a vehicle body according to an exemplary embodiment.

FIG. 12 is an exploded perspective view showing a side molding trim and a roof molding trim applied to the joint structure of a vehicle body according to an exemplary embodiment.

Referring to FIG. 2 to FIG. 5 and FIG. 12, the joint structure 100 according to an exemplary embodiment further includes a side molding trim 170 and a roof molding trim 180. The side molding trim 170 and the roof molding trim 180 are also shown in FIG. 6 to FIG. 8 and FIG. 10.

The side molding trim 170 is configured to seal between the front side structure 11 and the rear side structure 41 outside the front body module 10 and the rear body module 40.

The side molding trim 170 is connected to the front side outer member 17 and the rear side outer member 47 (see FIG. 6, FIG. 8, and FIG. 10). In one example, the side molding trim 170 may be formed of a plastic or rubber material. In another example, the side molding trim 170 may be connected to the front side outer member 17 and the rear side outer member 47 through an adhesive (not shown).

The roof molding trim 180 is configured to seal between the front roof structure 21 and the rear roof structure 51 on the outside of the front body module 10 and the rear body module 40.

The roof molding trim 180 is connected to the front roof panel 27 and the rear roof panel 57 (see FIG. 7 and FIG. 8). In one example, the roof molding trim 180 may be formed of a plastic or rubber material. In another example, the roof molding trim 180 may be connected to the front roof panel 27 and the rear roof panel 57 through an adhesive (not shown).

The side molding trim 170 and the roof molding trim 180 may be interconnected. The side molding trim 170 includes a fitting step portion 171 formed at an upper end. The roof molding trim 180 includes a connecting portion 181 that is fitted and connected to the fitting step portion 171 along the vertical direction (see FIG. 8 and FIG. 12).

Hereinafter, the assembly process and operation of the joint structure 100 according to an exemplary embodiment are explained in detail referring to FIG. 1 to FIG. 12.

In an exemplary embodiment, the under body 1 of a vehicle body is provided.

In an exemplary embodiment, the front body module 10 including the front side structure 11, the front roof structure 21, and the front floor structure 31 connected to each other is provided.

In an exemplary embodiment, the rear body module 40 including the rear side structure 41, the rear roof structure 51, and the rear floor structure 61 connected to each other is provided.

The front body module 10 and the rear body module 40 form the upper body 3 of the vehicle body. The front body module 10 is connected along the vertical direction to the front part of the under body 1. The front body module 10 may form the fixed part 10*a* fixed to the front part of the under body 1.

The front body module 10 and the rear body module 40 form the upper body 3 of the vehicle body. The front body module 10 is connected along the vertical direction to the front part of the under body 1.

The front body module 10 may form the fixed part 10a fixed to the front part of the under body 1.

The rear body module 40 is the variable part 40a that forms a rear cabin or luggage room at the rear of the vehicle body and forms the upper body 3 together with the front body module 10 as a hailing type or a delivery type. The rear body module 40 is coupled to the rear part of the under body 1 along the vertical direction.

As described above, in a state in which the front body module 10 and the rear body module 40 are connected to the under body 1 along the front-to-back direction of the vehicle body, the side outer joint bracket 71 is connected to the front side outer member 17 of the front side structure and connected to the rear side outer member 47 of the rear side structure 41 through the first sealing member 75.

The roof outer joint bracket 81 is connected to the front roof panel 27 of the front roof structure 21 and the rear roof panel 57 of the rear roof structure 51 through the second sealing member 85.

Then, at least one side inner joint bracket 110 is bolted to the front side inner member 13 of the front side structure 11 and the rear side inner member 43 of the rear side structure 41 along the vehicle width direction.

The side outer joint bracket 71 and at least one side inner joint bracket 110 are engaged along the vehicle width direction by the fastening member 190.

Then, at least one roof inner joint bracket 120 is bolted to the front roof inner member 23 of the front roof structure 21 and the rear roof inner member 53 of the rear roof structure 51 along the vertical direction.

The roof outer joint bracket 81 and at least one roof inner joint bracket 120 are engaged along the vertical direction by the fastening member 190.

Then, the upper overlap inner joint bracket 130 is mounted in the overlap sections (e.g., the upper corner) of the front side structure 11 and the front roof structure 21 connected to each other and of the rear side structure 41 and the rear roof structure 51 connected to each other.

The upper overlap inner joint bracket 130 is bolted to the front side inner member 13, the rear side inner member 43, the front roof inner member 23, and the rear roof inner member 53 along the vehicle width direction and the vertical direction.

The upper overlap inner joint bracket 130 is engaged with the side outer joint bracket 71 along the vehicle width direction and is engaged with the roof outer joint bracket 81 along the vertical direction by the fastening member 190.

The front floor panel 35 of the front floor structure 31 and the rear floor panel 65 of the rear floor structure 61 are connected by bolting along the vertical direction.

In this state, the first lower overlap inner joint bracket 140 is mounted in the overlap sections (e.g., the lower corner) of the front side structure 11 and the front floor structure 31 connected to each other and of the rear side structure 41 and the rear floor structure 61 connected to each other.

The first lower overlap inner joint bracket 140 is welded to the front side inner member 13, the rear side inner member 43, the front floor panel 35, and the rear floor panel 65 along the vehicle width direction and the vertical direction.

Then, the second lower overlap inner joint bracket 150 overlaps with the first lower overlap inner joint bracket 140. The second lower overlap inner joint bracket 150 is bolted to the front side inner member 13, the rear side inner member 43, the front floor panel 35, and the rear floor panel 65 along the vehicle width direction and the vertical direction.

This second lower overlap inner joint bracket 150 is engaged with the side outer joint bracket 71 along the vehicle width direction by the fastening member 190.

Then, the third lower overlap inner joint bracket 160 is bolted to the front side sill 11a of the front side structure 11 and the rear side sill 41a of the rear side structure 41 along the vehicle width direction and the vertical direction.

The third lower overlap inner joint bracket 160 is overlapped with the front floor panel 35, the rear floor panel 65, the first lower overlap inner joint bracket 140, and the second lower overlap inner joint bracket 150 in a vertical direction.

As such, the overlapping front floor panel 35, the rear floor panel 65, the first lower overlap inner joint bracket 140, the second lower overlap inner joint bracket 150, and the third lower overlap inner joint bracket 160 are engaged along the vertical direction by the fastening member 190.

Therefore, through a series of processes as described above, the front side structure 11, the front roof structure 21, and the front floor structure 31 of the front body module 10 are connected to the rear side structure 41, the rear roof structure 51, and the rear floor structure 61 of the rear body module 40 along the front-to-back direction of the vehicle body.

In this state, the side molding trim 170 is connected to the front side outer member 17 and the rear side outer member 47. In addition, the roof molding trim 180 is connected to the side molding trim 170 and is connected to the front roof panel 27 and the rear roof panel 57.

According to the joint structure 100 according to an exemplary embodiment as described so far, the front body module 10 as the fixed part 10a connected to the front part of the under body 1 is left as it is, and the rear body module 40 as the variable part 40a is connected to the rear part of the under body 1 and the front body module 10.

The joint structure 100 according to an exemplary embodiment replaces the rear body module 40 of a predetermined shape according to the type of customized service of the PBV (e.g., user case). Therefore, the PBV may be used as a vehicle of a hailing type or a delivery type.

In this way, the joint structure 100 according to an exemplary embodiment may promote cost reduction according to changing the structure of the upper body 3 of the vehicle body to suit various customized services of the PBV.

Meanwhile, in the joint structure 100 according to an exemplary embodiment, between the front body module 10 and the rear body module 40 may be sealed through the first sealing member 75, the second sealing member 85, the side molding trim 170, and the roof molding trim 180. Accordingly, the joint structure 100 according to an exemplary embodiment may secure the watertight performance of the PBV.

According to the joint structure 100 according to an exemplary embodiment, the front body module 10 and the rear body module 40 are engaged along the vehicle width direction and the vertical direction through the joint unit 70 and may be connected in the front-to-back direction of the vehicle body.

Therefore, the joint structure 100 according to an exemplary embodiment may secure connection strength and connection robustness according to the front-to-back direction of the vehicle body, the vehicle width direction, and the vertical direction of the front body module 10 and the rear body module 40.

Furthermore, according to the joint structure 100 according to an exemplary embodiment, the front side structure 11 and the rear side structure 41 connected to each other may form a double box cross-section by at least one first closed section 19 and at least one second closed section 49.

In addition, according to the joint structure 100 according to an exemplary embodiment, the front roof structure 21 and the rear roof structure 51 coupled to each other may form a double box cross-section by at least one third closed section 29 and at least one fourth closed section 59.

Thus, since the joint structure 100 according to an exemplary embodiment may smoothly distribute loads (e.g., collision loads, etc.) input to the vehicle body, crash performance and torsional strength of the vehicle body may be increased.

While embodiments of this invention have been described in connection with what is presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

What is claimed is:

1. A joint structure of a vehicle body, the joint structure comprising:
a front body module connected to a front part of an under body of the vehicle body;
a rear body module connected to a rear part of the under body of the vehicle body; and
a joint unit connecting an outside and an inside of the front body module and the rear body module in a front-to-back direction of the vehicle body, wherein the joint unit engages the front body module and the rear body module along a vehicle width direction and a vertical direction.

2. The joint structure of claim 1, wherein:
the front body module comprises a fixed part fixed to the front part of the under body; and
the rear body module has a predetermined shape and comprises a variable part detachably provided on the front body module and the rear part of the under body.

3. The joint structure of claim 1, wherein the front body module comprises a fixed part fixed to the front part of the under body.

4. A joint structure of a vehicle body, the joint structure comprising:
a front body module connected to a front part of an under body of the vehicle body, the front body module comprising a front side structure, a front roof structure, and a front floor structure connected to each other;
a rear body module connected to a rear part of the under body of the vehicle body, the rear body module comprising a rear side structure, a rear roof structure, and a rear floor structure connected to each other; and
a joint unit connecting an outside and an inside of the front body module and the rear body module in a front-to-back direction of the vehicle body.

5. The joint structure of claim 4, wherein the joint unit comprises:
a side outer joint bracket connecting the front side structure and the rear side structure in the front-to-back direction of the vehicle body on the outside of the front body module and the rear body module;
a roof outer joint bracket connected to the side outer joint bracket and connecting the front roof structure and the rear roof structure in the front-to-back direction of the vehicle body on the outside of the front body module and the rear body module;
a plurality of inner joint brackets connecting the front side structure and the rear side structure, the front roof structure and the rear roof structure, and the front floor structure and the rear floor structure in the front-to-back direction of the vehicle body on the inside of the front body module and the rear body module; and
a fastening member engaging the side outer joint bracket, the roof outer joint bracket, and the plurality of inner joint brackets.

6. The joint structure of claim 4, wherein:
the front side structure comprises a front side inner member, a front side reinforcement member, and a front side outer member connected to each other; and
the rear side structure comprises a rear side inner member, a rear side reinforcement member, and a rear side outer member connected to each other.

7. The joint structure of claim 6, wherein the joint unit comprises:
a side outer joint bracket supporting the front side outer member and the rear side outer member; and
at least one side inner joint bracket connected to the front side inner member and the rear side inner member by first bolts and engaged to the side outer joint bracket along a vehicle width direction by a fastening member.

8. The joint structure of claim 7, wherein the joint unit further comprises a first sealing member mounted between the side outer joint bracket, the front side outer member, and the rear side outer member.

9. The joint structure of claim 7, wherein:
the front roof structure comprises a front roof inner member, a front roof outer member, and a front roof panel connected to each other; and
the rear roof structure comprises a rear roof inner member, a rear roof outer member, and a rear roof panel connected to each other.

10. The joint structure of claim 9, wherein the joint unit comprises:
a roof outer joint bracket supporting the front roof panel and the rear roof panel; and
at least one roof inner joint bracket connected to the front roof inner member and the rear roof inner member by second bolts and engaged with the roof outer joint bracket along a vertical direction by a second fastening member.

11. The joint structure of claim 10, wherein the joint unit further comprises a second sealing member mounted between the roof outer joint bracket, the front roof panel, and the rear roof panel.

12. The joint structure of claim 10, wherein the joint unit further comprises an upper overlap inner joint bracket connected to the front side inner member and the rear side inner member and to the front roof inner member and the rear roof inner member by third bolts, connected to the side outer joint bracket along the vehicle width direction by a third fastening member, and connected to the roof outer joint bracket along the vertical direction.

13. The joint structure of claim 9, further comprising:
a side molding trim connected to the front side outer member and the rear side outer member and configured to seal between the front side structure and the rear side structure; and
a roof molding trim connected to the front roof panel and the rear roof panel and configured to seal between the front roof structure and the rear roof structure.

14. The joint structure of claim 13, wherein:

the side molding trim comprises a fitting step portion on an upper end; and the roof molding trim comprises a connecting portion connected to the fitting step portion along a vertical direction.

15. A joint structure of a vehicle body, the joint structure comprising:

a front body module connected to a front part of an under body of the vehicle body, the front body module comprising:

a front side structure, a front roof structure, and a front floor structure connected to each other;

wherein the front side structure comprises a front side inner member, a front side reinforcement member, and a front side outer member connected to each other; and wherein the front floor structure comprises a front cross member and a front floor panel connected to each other; and a rear body module connected to a rear part of the under body of the vehicle body, the rear body module comprising:

a rear side structure, a rear roof structure, and a rear floor structure connected to each other;

wherein the rear side structure comprises a rear side inner member, a rear side reinforcement member, and a rear side outer member connected to each other; and wherein the rear floor structure comprises a rear cross member and a rear floor panel connected to each other; and a joint unit connecting an outside and an inside of the front body module and the rear body module in a front-to-back direction of the vehicle body, the joint unit comprising:

a side outer joint bracket supporting the front side outer member and the rear side outer member; and at least one side inner joint bracket connected to the front side inner member and the rear side inner member by first bolts and engaged to the side outer joint bracket along a vehicle width direction by a fastening member.

16. The joint structure of claim 15, wherein the joint unit comprises a first lower overlap inner joint bracket connected to the front side inner member and the rear side inner member and to the front floor panel and the rear floor panel by welds.

17. The joint structure of claim 16, wherein the joint unit further comprises a second lower overlap inner joint bracket overlapped with the first lower overlap inner joint bracket, connected to the front side inner member and the rear side inner member and to the front floor panel and the rear floor panel by second bolts, and engaged with the side outer joint bracket along the vehicle width direction by a second fastening member.

18. The joint structure of claim 17, wherein the front floor panel and the rear floor panel are overlapped with the first lower overlap inner joint bracket and the second lower overlap inner joint bracket along a vertical direction.

19. The joint structure of claim 17, wherein the joint unit further comprises a third lower overlap inner joint bracket engaged with a front side sill and a rear side sill and with the front floor panel and the rear floor panel by third bolts.

20. The joint structure of claim 19, wherein the front floor panel, the rear floor panel, the first lower overlap inner joint bracket, the second lower overlap inner joint bracket, and the third lower overlap inner joint bracket are engaged along a vertical direction by a third fastening member.

* * * * *